(12) United States Patent
Shi et al.

(10) Patent No.: US 6,756,071 B1
(45) Date of Patent: Jun. 29, 2004

(54) METHOD FOR MANUFACTURING A GMR SPIN VALVE HAVING A SMOOTH INTERFACE BETWEEN MAGNETIC AND NON-MAGNETIC LAYERS

(75) Inventors: Zhupei Shi, San Jose, CA (US); Ming Mao, Pleasanton, CA (US); Qunwen Leng, San Jose, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 10/243,401

(22) Filed: Sep. 12, 2002

Related U.S. Application Data

(63) Continuation of application No. 09/454,202, filed on Dec. 3, 1999, now Pat. No. 6,479,096.

(51) Int. Cl.[7] ................................................. B05D 5/12
(52) U.S. Cl. ....................... 427/130; 427/131; 427/132; 427/404
(58) Field of Search ................................ 427/130, 131, 427/132, 404

(56) References Cited

U.S. PATENT DOCUMENTS

| | | | |
|---|---|---|---|
| 5,476,680 A | | 12/1995 | Coffey et al. |
| 5,585,167 A | * | 12/1996 | Satoh et al. ................. 428/216 |
| 5,657,190 A | | 8/1997 | Araki et al. |
| 5,738,946 A | | 4/1998 | Iwasaki et al. |
| 5,766,743 A | | 6/1998 | Fujikata et al. |
| 5,780,176 A | | 7/1998 | Iwasaki et al. |
| 5,783,284 A | | 7/1998 | Shinjo et al. |
| 5,789,069 A | | 8/1998 | Araki et al. |
| 5,796,560 A | | 8/1998 | Saito et al. |
| 5,798,896 A | | 8/1998 | Araki et al. |
| 5,818,684 A | | 10/1998 | Iwasaki et al. |
| 5,835,003 A | | 11/1998 | Nickel et al. |
| 5,849,422 A | * | 12/1998 | Hayashi ....................... 428/611 |
| 5,856,897 A | | 1/1999 | Mauri |
| 5,872,502 A | | 2/1999 | Fujikata et al. |
| 5,914,597 A | | 6/1999 | Fujii et al. |
| 6,052,262 A | * | 4/2000 | Kamiguchi et al. .......... 360/113 |
| 6,094,325 A | * | 7/2000 | Tagawa et al. .............. 360/113 |
| 6,106,609 A | * | 8/2000 | Yang et al. .................... 117/11 |
| 6,479,096 B1 | | 11/2002 | Shi et al. |
| 2002/0122278 A1 | | 9/2002 | Shimazawa |

OTHER PUBLICATIONS

J.C.S. Kools, Exchange–Biased Spin–Valves for Magnetic Storage, Feb. 16, 1996, I.E.E.E. vol. 32, No. 4.
W.H. Butler et al., Conductance and Giant Magnetoconductance of Co/Cu/Co Spin Valves: Experiment & Theory. May 23, 1997, Physical Review vol. 56 No. 22.
J. Camarero et al., Atomistic Mechanism of Surfactant–Assisted Epitaxial Growth, Feb. 20, 1998, Physical Review vol. 81 No. 4.
Camarero et al., "Atomistic Mechanism of Surfactant–Assisted Epitaxial Growth," Physical Review Letters, Jul. 27, 1998, pp. 850–853, vol. 81, No. 4.

* cited by examiner

*Primary Examiner*—Bernard Pianalto
(74) *Attorney, Agent, or Firm*—Carr & Ferrell LLP

(57) ABSTRACT

A GMR spin valve is provided for reading a magnetic signal from a magnetic recording medium. The spin valve includes a non-magnetic layer such as for example copper, separated by first and second magnetic layers. The spin valve includes a pinned magnetic layer and a free magnetic layer, the resistance of the spin valve changing with the relative angle between the direction of magnetization of free and pinned layers. Extremely smooth surfaces are provided at the interfaces between the non-magnetic layer and the adjacent magnetic layers. This smooth interface greatly enhances the performance and reliability of the spin valve by allowing extremely tight control of the thickness of the non-magnetic layer and by preventing atomic diffusion between the non-magnetic and magnetic layers. This smooth interface is achieved by including a surfactant in the deposition of the non-magnetic layer.

17 Claims, 11 Drawing Sheets

METHOD FOR MANUFACTURING A GMR SPIN VALVE HAVING A SMOOTH INTERFACE BETWEEN MAGNETIC AND NON-MAGNETIC LAYERS

This application is a continuation of U.S. application Ser. No. 09/454,202 filed on Dec. 3, 1999, now U.S. Pat. No. 6,479,096 and claims priority therefrom pursuant to 35 U.S.C. §120.

FIELD OF THE INVENTION

This invention relates generally to magnetic disk drives, and more particularly to spin valve giant magnet or resistive (GMR) thin film read heads.

BACKGROUND OF THE INVENTION

Magnetic disk drives are used to store and retrieve data for digital electronic apparatus such as computers. In FIGS. 1A and 1B, a magnetic disk drive D of the prior art includes: a sealed enclosure 1; a disk drive motor 2; a magnetic disk 3 supported for rotation by a spindle S1 of motor 2; an actuator 4; and an arm 5 attached to a spindle S2 of actuator 4. A suspension 6 is coupled at one end to the arm 5, and at its other end to a read/write head or transducer 7. The transducer 7 is typically an inductive write element with a sensor read element. As the motor 2 rotates the disk 3, as indicated by the arrow R, an air bearing is formed under the transducer 7 to lift it slightly off of the surface of the disk 3. Various magnetic "tracks" of information can be read from the magnetic disk 3 as the actuator 4 is caused to pivot in a short arc as indicated by the arrow P. The design and manufacture of magnetic disk drives is well known to those skilled in the art The most common type of sensor used in the transducer 7 is the magnetoresistive sensor. A magnetoresistive (MR) sensor is used to detect magnetic field signals by means of changing resistance in a read element. A conventional MR sensor utilizes the anisotropic magnetoresistive (AMR) effect for such detection, where the read clement resistance varies in proportion to the square of the cosine of the angle between the magnetization in the read element and the direction of a sense current flowing through the read element. When there is relative motion between the MR sensor and a magnetic medium (such as a disk surface), a magnetic field from the medium causes a change in the direction of magnetization in the read element, thereby causing a corresponding change in resistance of the read element. The change in resistance can be detected to recover the recorded data on the magnetic medium.

Another form of magnetetoresistance is known as spin valve magnetoresistance or giant magnetoresistance (GMR). In such a spin valve sensor, two ferromagnetic layers are separated by a non-magnetic layer such as copper. One of the ferromagnetic layers is a "free" layer and the other ferromagnetic layer is a "pinned" layer. This pinning is typically achieved by providing an exchange-coupled anti-ferromagnetic layer adjacent to the pinned layer.

More particularly, and with reference to FIG. 1C, a shielded, single-element magnetoresistive head (MRH) 10 includes a first shield 12, a second shield 14, and a spin valve sensor 16 disposed within a gap (G) between shields 12 and 14. An air bearing surface S is defined by the MRH 10. The spin valve sensor is preferably centered within the gap G to avoid self-biasing effects. Lines of magnetic flux impinging upon the spin valve sensor create a detectable change in resistance. The design and manufacture of magnetoresistive heads, such as MRH 10, are well known to those skilled in the art.

With reference to FIG. 2A, a cross-sectional view taken along line 2—2 of FIG. 1C illustrates the structure of the spin valve sensor 16 of the prior art. The spin valve sensor 16 is built upon a substrate 17 and includes: an anti-ferromagnetic layer 24; a pinned layer 22; a first cobalt enhanced layer 19; a thin copper layer 20; a second cobalt enhanced layer 23 and a free layer 18. Ferromagnetic end regions 21 abut the ends of the spin valve sensor 16. Leads 25, typically made from gold or another low resistance material, bring the current to the spin valve sensor 16. A capping layer 27 is provided over the free layer 18 opposite the Co enhanced layer 23. A current source 29 provides a current $I_b$ which flows through the various layers of the sensor 16, and signal detection circuitry 31 detects changes in resistance of the sensor 16 as it encounters magnetic fields.

The free and pinned layers 18 and 22 are typically made from a soft ferromagnetic material such as Permalloy. As is well known to those skilled in the art, Permalloy is a magnetic material nominally including 80% nickel (Ni) and 20% iron (Fe). While the layer 20 is typically copper, other non-magnetic materials have been used as well. The cobalt enhanced layer can be preferably constructed of Co or more preferably of $Co_{90}Fe_{10}$. The AFM layer 24 is used to set the magnetic direction of the pinned layer 22.

With continued reference to FIG. 2A, the spin valve sensor 16 develops a rough interface between the copper layer 20 and the cobalt enhanced layer 23. This can be understood better with reference to FIG. 2B, wherein the interface is shown at the atomic level. Both the copper layer 20, shown in solid, and the cobalt enhanced layer 23 have face centered cubic (FCC) crystalline structures. However, as the copper is deposited onto the first cobalt enhanced layer 19, the copper tends to form in groups or "islands" rather than being deposited layer by layer as would be desired. This leads to a rough copper surface upon which the second must subsequently be deposited. Therefore, the interface 30 between the copper spacer layer and the second cobalt enhanced layer 23 takes on this rough texture as shown in FIG. 2A.

With reference to FIGS. 3A and 3B, the free layer 18 can have a magnetization vector 26 which is free to rotate about an angle α, while the pinned layer 22 is magnetized as indicated by the arrow 28. Absent the influence of a magnetic field, such as that provided by a magnetic recording medium, the magnetization of the free layer, as represented by arrow 30, would ideally be perpendicular to the direction of the magnetization 28 of the pinned layer 28. However, when the free layer is subjected to a magnetic field, represented by arrow 32, the resulting magnetization 26 of the free layer becomes the sum of the magnetic flux magnetization 32 and the magnetization 30. It is a property of GMR heads that as the angle α changes, the resistance of the sensor 16 will change. The relationship between the angle α and the resistance of the sensor will be essentially linear in the region of α=0 degrees (i.e. when vector 26 is approximately perpendicular to vector 28. This can be seen with reference to FIG. 3B.

With reference to FIG. 3C, a GMR read element 10 which does not have an initial angle α which is substantially equal to zero in the absence of any external magnetic field will experience errors when reading data. A typical magnetic recording medium records data as a series of magnetic pulses in the form of waves. The sensor reads these waves and generates a signal having a sensor output, i.e. Track Average Amplitude (TAA). As can be seen with reference to FIG. 3C, a positive magnetic pulse results in an output amplitude $TAA_1$ followed by an equivalent negative pulse resulting in a sensor output amplitude $TAA_2$ of the same absolute value. If a read sensor 10 has an initial magnetization angle α of zero then the read sensor will be able to, detect these opposite pulses as such. However, if the angle is substantially greater than or less than zero the read sensor will impart an offset error which will cause the sensor to read one of the pulses as being larger than it actually is and the other as being smaller. In such a case, the sensor may not register the smaller pulse and may miss that bit of data. The tendency of read heads to impart such an offset error is termed Track Average Amplitude Asymmetry (TAAA) and is defines as $(TAA_1-TAA_2)/(TAA_1+TAA_2)$. A TAAA of less than 15% is generally required for a read head to function properly.

With brief reference to 3A, in order for α to equal 0 in the free state, several magnetic forces acting on a magnetization vector 26 of the free layer 18 must balance to 0. In FIG. 3D, $H_d$ represents a demagnetization vector. Demagnetization can be controlled by adjusting the thickness of the pinned layer 22. This $H_d$ is offset by an interlayer magnetic coupling field $H_{int}$ and a current induced magnetic field $H_i$. $H_i$ is controlled by the bias current $I_b$ and is generally set by design considerations external to the head 10 itself. Correct operation of the head 10 requires that the these three magnetic field vectors: $H_d$, $H_{int}$ and $H_i$ sum to 0.

With reference to FIG. 4 $H_{int}$, is dependent upon the thickness $t_{cu}$ (FIG.2A) of the copper layer. The thickness of the copper layer is desirably chosen so that $H_{int}$ will be 0. Furthermore, the sensitivity of the sensor (Δr/r) increases with decreasing copper layer thickness. Therefore, the copper layer is preferably chosen to have a thickness corresponding to node 34 in FIG. 4. However, as indicated by the steep slope of the curve in region 34, $H_{int}$ changes drastically with copper spacer thickness in this region. In fact a single angstrom change in copper layer thickness can have a substantial impact upon $H_{int}$. Therefore, control of copper layer thickness is critical in the design and production of GMR heads. However, as will be appreciated, any roughness in the interface between the copper layer and adjacent magnetic layers will render such copper layer thickness variable across the surface of the copper layer.

Another problem experienced by GMR heads, is that of diffusion at high temperatures. Migration of atoms across the interface between the copper layer and the adjacent magnetic layers results in degradation of performance. This is especially a problem when the sensor is subjected to high temperatures. It has been discovered that roughness of the interface contributes greatly to such diffusion.

Therefore, there remains a need for a GMR sensor and a method of manufacturing the same which will allow a smooth interface between the copper layer and adjacent pinned and free magnetic layers. Such a GMR head would achieve the benefit of tighter control of copper layer thickness as well as reduced diffusion of atoms across the interface.

SUMMARY OF THE INVENTION

The present invention provides a spin valve sensor having improved performance, reliability and durability and a method of manufacturing same. The spin valve includes a copper layer separating first and second magnetic layers disposed adjacent the copper layer. The spin valve achieves the above described beneficial results by maintaining a very smooth interface between the copper layer and the adjacent magnetic layers. An anti-ferromagnetic (AFM) layer fixes the magnetization of a pinned layer. The spin valve also includes a free layer having a magnetization which can move under the influence of an external magnetic field. Changes in relative orientation of magnetizations between the free and pinned layers cause measurable changes in the resistance of the spin valve.

By providing improved interfaces between the copper layer and adjacent magnetic layers, the copper layer thickness can be precisely controlled. This results in the ability to precisely control the relative magnetization angles between the free and pinned layers. Furthermore, such a smooth interfaces maximize Δr/r performance. These improved interfaces between the copper and adjacent magnetic layers also act to prevent inter layer diffusion of atoms which would degrade performance of the spin valve, especially at high temperatures, and would decrease the life of the spin valve.

More particularly, the spin valve includes a substrate upon which the spin valve is built. This substrate may be, for example, ceramic. The AFM layer is deposited onto the substrate and the pinned layer is subsequently deposited onto the AFM layer. The pinned layer can be preferably constructed of Co or more preferably of $Co_{90}Fe_{10}$.

An ultra thin layer of lead is deposited onto the pinned layer. This layer of lead is preferably no more than two or three atoms thick and most preferably is no more than a single atom thick. With the lead deposited onto the pinned layer, a copper layer is then deposited onto the lead. The presence of the lead serves as a surfactant, causing the copper atoms to move to the desired location, growing layer by layer in a face centered cubic structure. As the copper is deposited, the lead rises to remain on the top of the deposited copper layer. The lead continues to migrate as the spin valve is formed, so that when the spin valve is completed, no detectable trace of the lead remains.

The layer by layer growth of the copper layer provides a smooth surface on which to deposit a cobalt (Co) enhanced layer. The Co enhanced layer preferably consists of $Co_{90}Fe_{10}$. The free magnetic layer is then deposited onto this Co enhanced layer.

Thereafter, ferromagnetic end regions are provided at the ends of the spin valve so as to span across the various layers of the spin valve. A pair of leads are also provided to allow a bias current to be fed through the spin valve.

The improved interface provided between the copper layer and the adjacent layers allows the copper layer thickness to be tightly controlled, thereby improving sensor performance and reliability. Furthermore, these improved interfaces prevent interlayer diffusion, also as discussed above.

These and other advantages of the invention will become apparent to those skilled in the art upon a reading of the following descriptions of the invention and a study of the several figures of the drawing.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 5A:
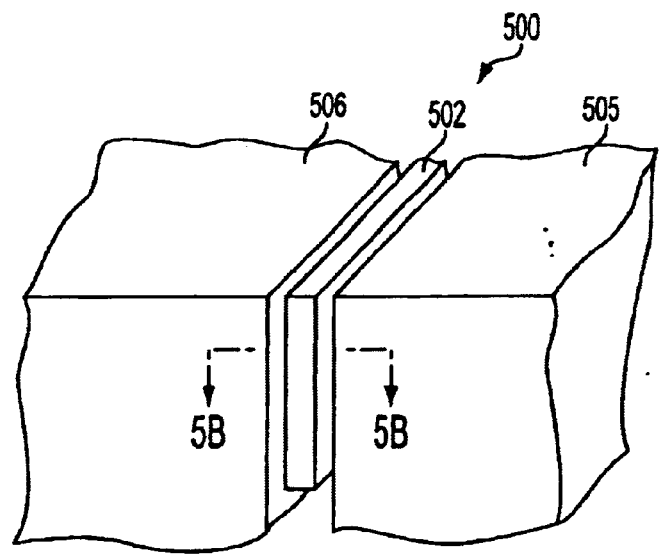
FIG. 5A is a perspective view of a shielded vertical magnetoresistive spin valve sensor head according to the present invention.
Figure 5B:
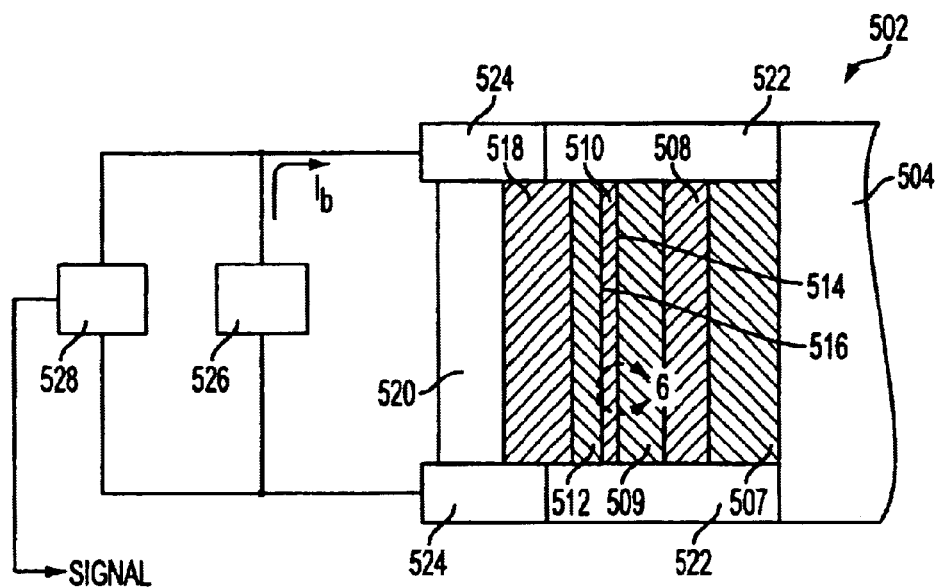
FIG. 5B is a cross sectional view of the spin valve sensor and associated substrates, support structures,,and circuitry taken along line 2—2 of FIG. 1C, shown enlarged.

FIGS. 1A–C, 2A–B, 3A–C and 4 were discussed with reference to the prior art. With reference to FIGS. 5A–B, a read head 500 of the present invention includes a GMR spin valve 502 disposed between first and second shields 505 and 506. The GMR spin valve 502 is built upon a substrate 504 which can be constructed of many suitable materials, for example ceramic. An AFM pinning layer 507 abuts the substrate 504 and also abuts a pinned layer 508. The pinned layer 508 is constructed of a magnetic material and is preferably constructed of $Co_{90}Fe_{10}$ or alternatively of Co. However, if layer 508 is made of $Ni_{80}Fe_{20}$, a first cobalt enhanced layer 509 must be formed adjacent the pinned layer 508, opposite the AFM pinning layer 507 and is most preferably constructed of $Co_{90}Fe_{10}$ or alternatively of Co. A very thin copper spacer layer 510 is formed adjacent the first cobalt enhanced layer 509. A second cobalt enhanced layer 512, most preferably constructed of $Co_{90}Fe_{10}$ or alternatively of Co, abuts the copper layer 510 opposite the first cobalt enhanced layer 509. While the first and second cobalt enhanced layers 509 and 512 are preferably constructed of $Co_{90}Fe_{10}$ or of Co, other magnetic material would also be suitable.

With continued reference to FIG. 5B, there exists an interface 514 between the first cobalt enhanced layer 509, and the copper layer 510. Similarly, there exists an interface between the copper layer 510 and the second cobalt enhanced layer 512. Both of these interfaces are very smooth. These smooth interfaces preferably have a roughness of less than 100 atomic diameters and more preferably less than about 50 atomic layers. Even more preferably each of these interfaces has a roughness which is no greater than a few atomic diameters, and most preferably only one or two atomic diameters. A mechanism for achieving these extremely smooth interfaces will be discussed further below.

A free layer 518 adjoins the cobalt enhanced layer 512 opposite the copper layer 510. While the free layer 518 could be constructed of any suitable magnetic material, it is preferably constructed of an alloy of nickel and iron. More preferably, the free layer 518 is constructed of $Ni_{80}Fe_{20}$. A capping layer 520 seals the spin valve 502.

Ferromagnetic end regions 522 abut the ends of the spin valve sensor 502. Leads 524, typically made from gold or another low resistance material, bring the current to the spin valve sensor 502. A current source 526 provides a current $I_b$ to flow through the various layers of the sensor 502, and signal detection circuitry 528 detects changes in resistance of the sensor 502 as it encounters magnetic fields.

Figure 6:
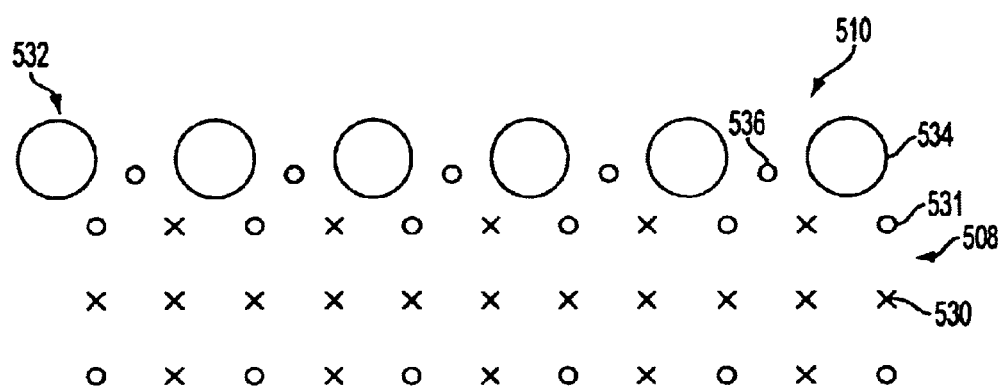
FIG. 6 is a view taken from area 6 of FIG. 5B showing the spin valve sensor in an intermediate stage of development and enlarged to the atomic level.

With reference to FIG. 6 the construction of the spin valve 502 having smooth interfaces 514 and 516 between the copper layer 510 and the cobalt enhanced layers 509 and 512 will be described. In the preferred embodiment of the invention, the first cobalt enhanced layer 509 consists of Co atoms or more preferably consists of $Co_{90}Fe_{10}$ wherein Co atoms 530 and Fe atoms 531 are arranged in a FCC structure. On top of the layer 509, a surfactant layer 532 is deposited. The surfactant is preferably in the form of an ultra thin layer 532 of lead (Pb) atoms 534. The lead atoms 534 are preferably deposited no more than two or three atomic layers thick and more preferably no more than a single atomic layer thick. Lead atoms residing on top of a Cu(111) surface, for example, are known to form a compact, quasi-hexagonal layer. The term surfactant is used herein to describe a material which affects the surface properties of another material while not necessarily becoming part of the structure of that surface.

With continued reference to FIG. 6, the copper layer 510 is then deposited on top of the surfactant layer 532. Individual copper atoms 536 are indicated as solid circles. The presence of the Pb atoms 534 causes the copper atoms 536 to move to desired locations so that the copper forms a FCC structure and grows layer by layer rather than in islands or individual groups. The mechanism by which this occurs is discussed in an article by J. Camerero et al., entitled *Atomistic Mechanism of Surfactant-Assisted Epitaxial Growth*, Physical Review Letters, Volume 81, 850 (1998), which is incorporated herein by reference in its entirety. The above cited article describes the use of a surfactant to generate a smooth interface between materials. Under surfactant-assisted epitaxial growth, layer by layer growth occurs while the surfactant efficiently floats at the external surface. The authors state that "the diffusion of Cu atoms to the steps have taken place underneath the compact Pb overlayer," and conclude that "the main effect of the Pb surfactant is to modify the mechanism of atomic diffusion on the terraces of Cu(111), which now takes place below the surfactant layer and by exchange."

Figure 7:
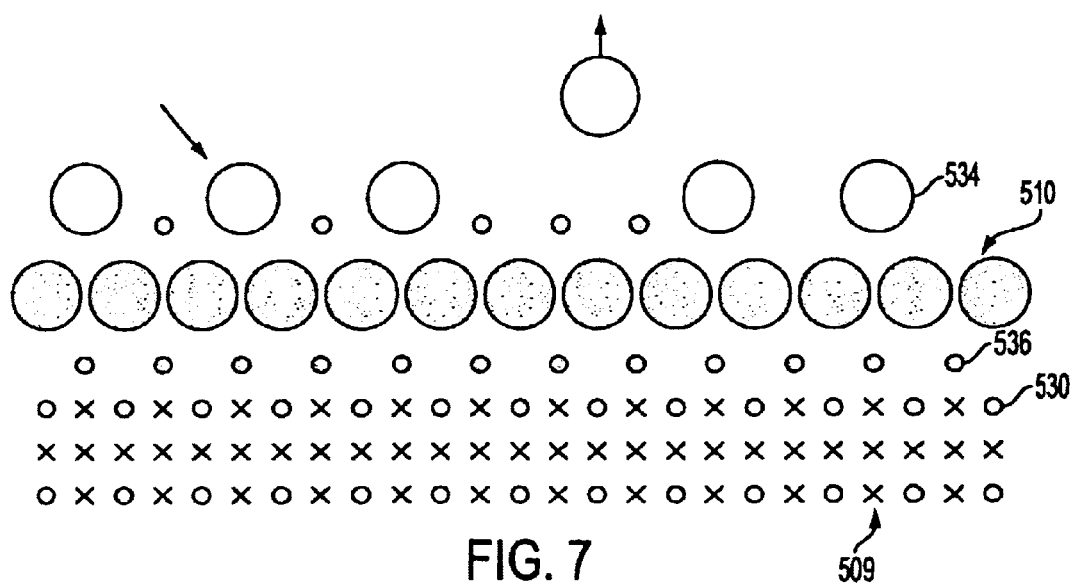
FIG. 7 is a view similar to that of FIG. 6 showing the spin valve sensor in another a subsequent, intermediate stage of development.

With reference to FIG. 7, as the copper atoms move to the desired locations in the layer by layer growth of the FCC crystalline structure, the Pb atoms 534 migrate away from the first cobalt enhanced layer 509. This upward migration continues throughout the formation of spin valve 502. The copper 510 continues to grow atomic layer by atomic layer, thereby maintaining a very smooth surface, so that when the second cobalt enhanced layer 512 is deposited onto the copper layer 510 a very smooth interface will be formed between the layers 510 and 512.

Figure 8:
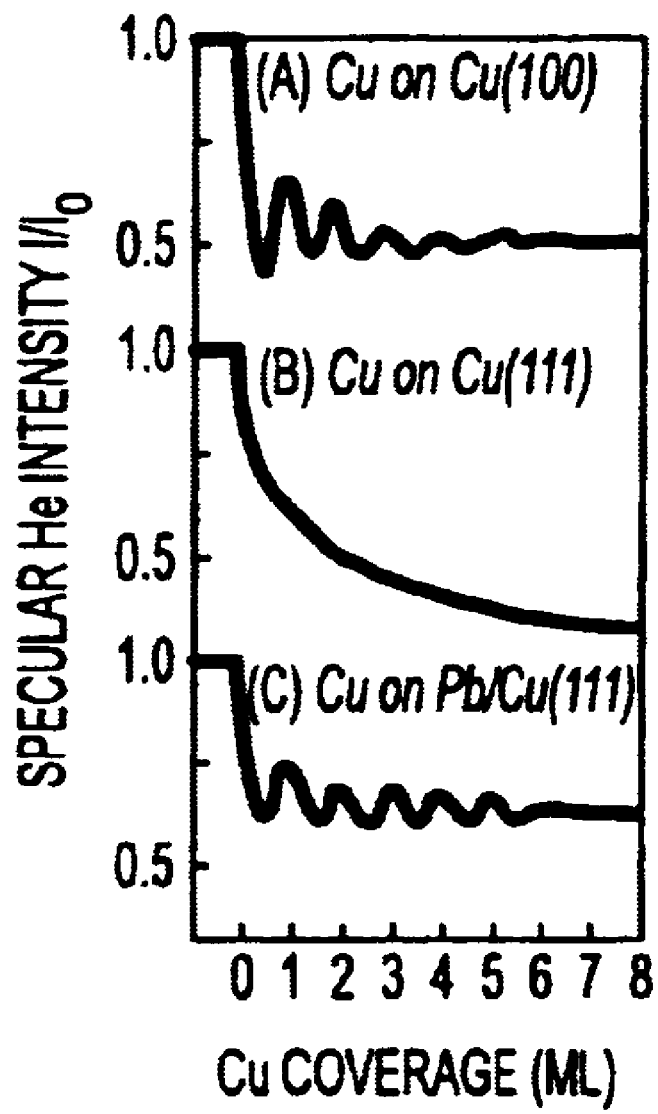
FIG. 8 is a graph showing the spectral intensity exhibited by copper with respect to copper coverage for copper deposited on several types of substrates.

The layer by layer growth of the copper layer 510 is evidenced by FIG. 8 which illustrates the specular intensities of several copper surfaces. Curve (A) shows the periodic oscillations of the specular intensity of layer by layer growth of Cu on Cu(100). This is compared with curve (B) which illustrates the monotonic decrease in specular intensity of Cu on Cu(111) which reveals the three dimension growth of copper as it forms islands or groups. Curve (C), on the other hand shows periodic oscillations in spectral intensity evidencing the layer by layer growth of Cu on the surfactant covered copper of the present invention.

With a very smooth interface thus formed at the interfaces 514 and 516, the thickness of the copper layer can be tightly controlled and remains constant throughout the copper layer. This allows the magnetization of the free layer to be precisely controlled as discussed above. Furthermore, providing such very smooth interfaces prevents diffusion of atoms across the interfaces, thereby extending the life and reliability of the spin valve. With the second cobalt enhanced layer 512 deposited onto the copper layer 510, the construction of the read head 500 can continue according to the methods of the prior art. As a further benefit of the present invention, research has shown that the $\Delta r/r$ value for a spin valve 502 is maximized when smooth interfaces 514, 516 exist between the copper layer 510 and the adjacent magnetic layers 508, 512.

Figure 9:
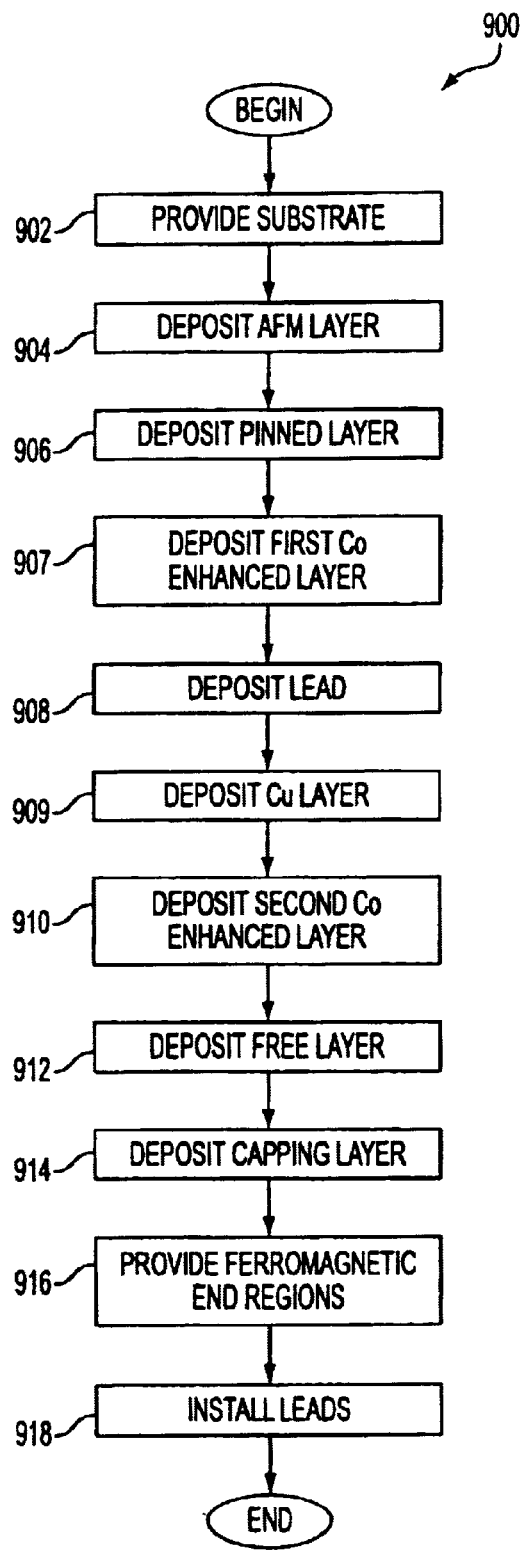
FIG. 9 is process diagram illustrating a method of constructing a spin valve sensor of the present invention.

With reference to FIG. 9, a process 900 for constructing the spin valve 502 of the present invention will be described. The process 900 begins with a step 902 of providing a substrate, which can be a ceramic material. This is followed by a step 904 of depositing the AFM layer 507 onto the substrate. The AMF layer can be deposited by plating. Then, in a step 906, the pinned layer 508 is deposited onto the AFM layer. While the pinned layer can be constructed of many suitable magnetic materials it is preferably constructed of $Ni_{80}Fe_{20}$. Then in a step 907, the first magnetic, or cobalt enhanced, layer 509 is deposited onto the pinned layer 508. Then in a step 908, the layer 534 is deposited a single atomic layer thick, onto the first cobalt enhanced layer 509. Subsequently in a step 909, the copper 536 is deposited onto the lead 532. The copper can be deposited by sputtering. As the copper is deposited, the lead migrates above the copper while causing the copper to grow a single layer at a time in a FCC structure.

When the desired copper thickness has been reached, the second cobalt enhanced magnetic layer 512 can be deposited in a step 910. The layer by layer growth of the copper in step 910 provides a very smooth surface on which to deposit the second cobalt enhanced layer 512, producing the very smooth interface 516 between the copper layer 510 and the second cobalt enhanced layer 512. Then in a step 912, the free layer 518 is deposited onto the second cobalt enhanced layer 512. In a step 914, the capping layer 520 is provided adjacent the free layer, and in a step 916 the ferromagnetic end regions 522 are provided at either end of the spin valve. Finally in a step 918, the leads 524 are installed to provide electrical connection to the required circuitry 526 and 528.

It will therefore be apparent that the present invention provides a method for manufacturing a spin valve having smooth interfaces between the copper layer 510 and adjacent magnetic, cobalt enhanced layers 509 and 512. These smooth interfaces 514 and 516 provide multiple benefits. First, the thickness of the copper layer 510 can be precisely controlled, thereby allowing $H_{int}$ to be precisely controlled. Second maintaining smooth interfaces 514 and 516 maximizes $\Delta r/r$, thereby improving the performance of the spin valve 510. Finally, the smooth interfaces prevent interlayer diffusion of atoms which would otherwise degrade performance of the spin valve over time, especially at high temperatures. In this way the life, durability and reliability of the spin valve 510 is improved.

While this invention has been described in terms of a preferred embodiment, it is contemplated that alternatives, modifications, permutations and equivalents thereof will become apparent to those skilled in the art upon a reading of the specification and study of the drawings. It is therefore intended that the following appended claims include all such alternatives modifications, permutations and equivalents as fall within the true spirit and scope of the present invention.

What is claimed is:

1. A method of constructing a spin valve comprising:
   forming a first magnetic layer;
   forming a first non-magnetic layer onto the first magnetic layer;
   forming a second non-magnetic layer between the formed first magnetic layer and the formed first non-magnetic layer;
   forming a second magnetic layer; and
   forming an anti-ferromagnetic layer adjacent one of the first and second magnetic layers.

2. The method of claim 1 wherein the second non-magnetic layer grows layer-by-layer.

3. The method of claim 1 wherein the first non-magnetic layer floats at an external surface of the second non-magnetic layer during the formation of the second non-magnetic layer.

4. The method of claim 1 wherein the first non-magnetic layer is no more than two atomic layers thick.

5. The method of claim 1 wherein the first non-magnetic layer is one atomic layer thick.

6. The method of claim 1 wherein the first non-magnetic layer includes Pb.

7. The method of claim 6 wherein the Pb forms a quasi-hexagonal layer.

8. The method of claim 1 wherein the first magnetic layer includes Co.

9. The method of claim 1 wherein the second non-magnetic layer includes Cu.

10. The method of claim 1 wherein the first magnetic layer includes $Co_{90}Fe_{10}$.

11. The method of claim 1 wherein the second magnetic layer includes Ni and Fe.

12. The method of claim 1 wherein the second magnetic layer includes $Co_{90}Fe_{10}$.

13. The method of claim 1, wherein forming a second non-magnetic layer moves the first non-magnetic layer away from the first magnetic layer.

14. The method of claim 1, wherein essentially no detectable trace of the first non-magnetic layer remains when the method is completed.

15. A method of constructing a spin valve comprising:
   forming a first magnetic layer;
   forming a first non-magnetic layer onto the first magnetic layer, the first non-magnetic layer being configured to act as a surfactant;
   forming a second non-magnetic layer between the first magnetic layer and the first non-magnetic layer, the first non-magnetic layer acting as a surfactant during formation of the second non-magnetic layer, the second non-magnetic layer being formed with a roughness responsive to the surfactant;

forming a second magnetic layer; and forming an anti-ferromagnetic layer adjacent one of the first and second magnetic layer.

16. The method of claim 15, wherein the roughness is less than 100 atomic diameters.

17. The method of claim 15, wherein the first non-magnetic later does not necessarily become part of the structure of the spin valve.

\* \* \* \* \*

UNITED STATES PATENT AND TRADEMARK OFFICE
CERTIFICATE OF CORRECTION

PATENT NO.    : 6,756,071 B1                                    Page 1 of 1
DATED         : June 29, 2004
INVENTOR(S)   : Zhupei Shi et al.

Figure 1A:
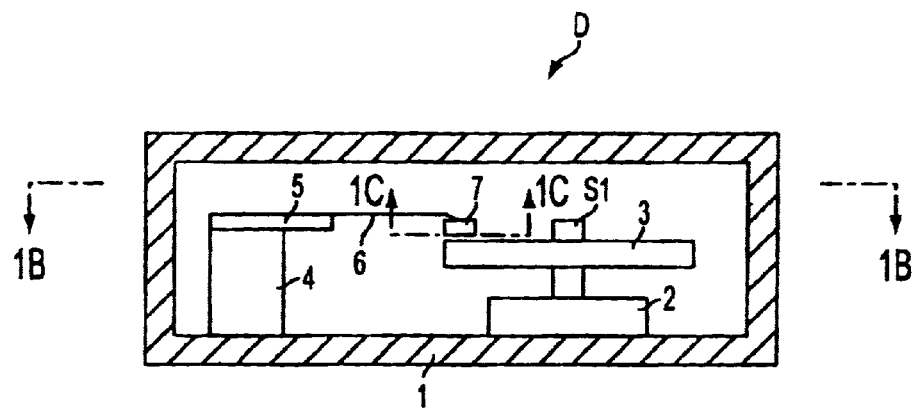
FIG. 1A is a partially sectioned, front elevational view of a magnetic disk drive assembly of the prior art.
Figure 1B:
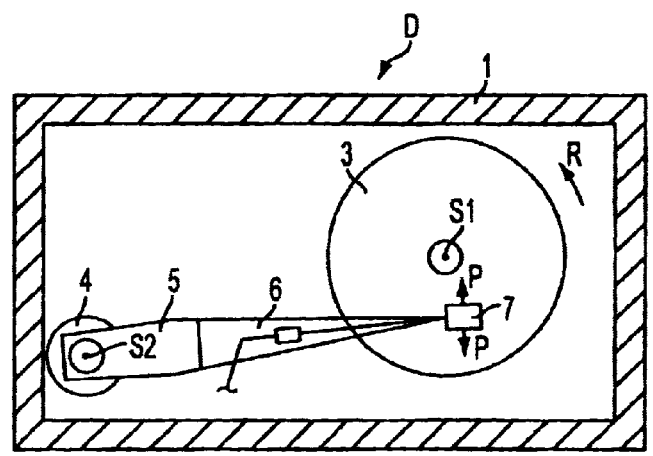
FIG. 1B is a cross section taken along line 1B—1B—of FIG. 1A.
Figure 1C:
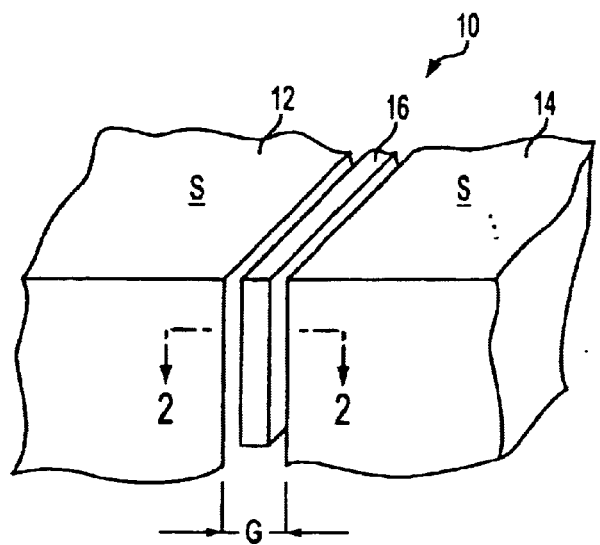
FIG. 1C is a perspective view of a prior art shielded vertical magnetoresistive spin valve sensor head.
Figure 2A:
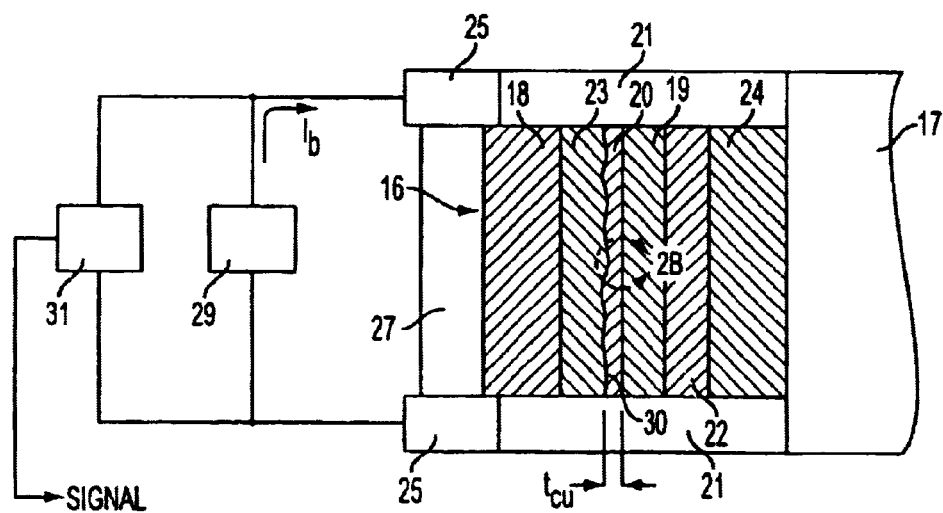
FIG. 2 is a cross sectional view of the prior art spin valve sensor of the prior art and associated substrates, support structures, and circuitry taken along line 2—2 of FIG. 1C, shown enlarged.
FIG. 2B is a view of area 2B of FIG. 2A shown rotated 90 degrees clockwise and enlarged to the atomic level.
Figure 2B:
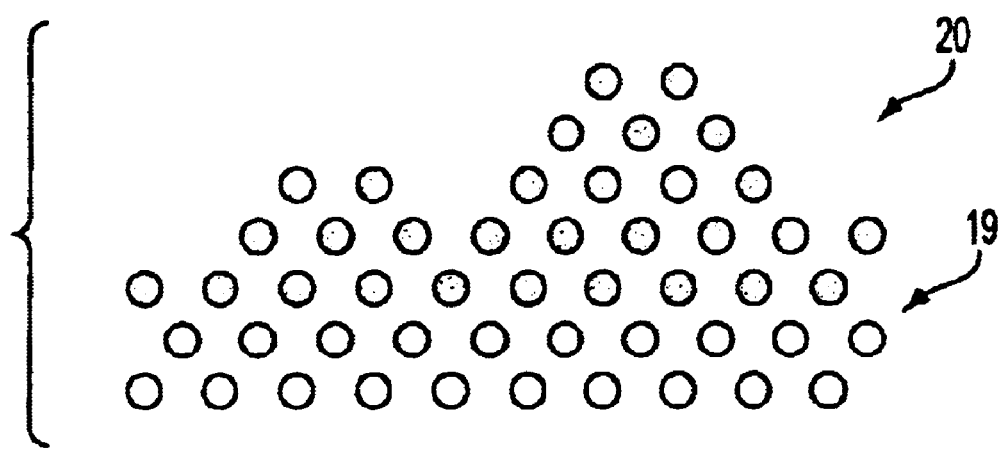
Figure 3A:
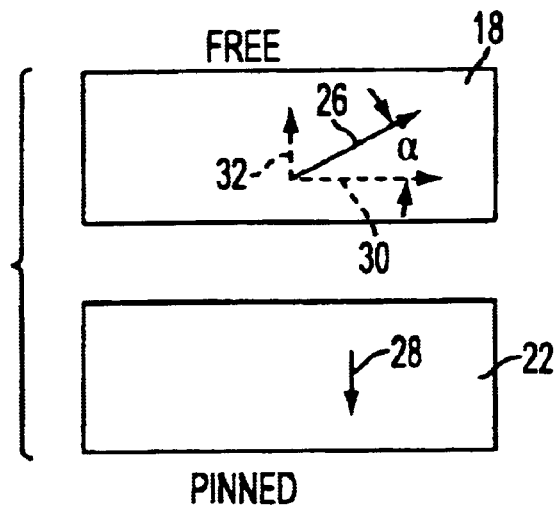
FIG. 3A illustrates the directions of magnetization of free and pinned layers in the spin valve.
Figure 3B:
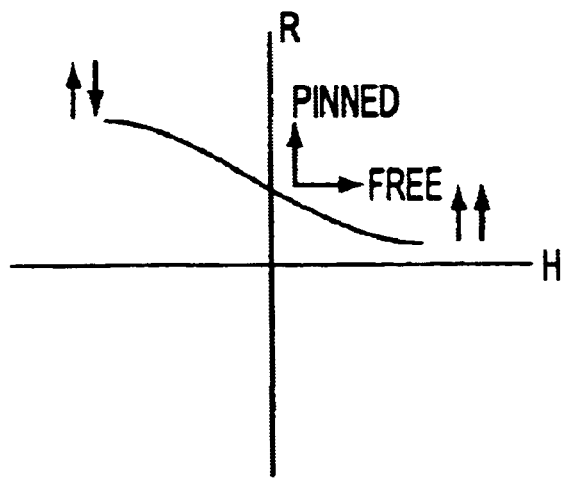
FIG. 3B is a graph illustrating the relationship between the electrical resistance of the spin valve and the relative directions of magnetization between the free and pinned layers.
Figure 3C:
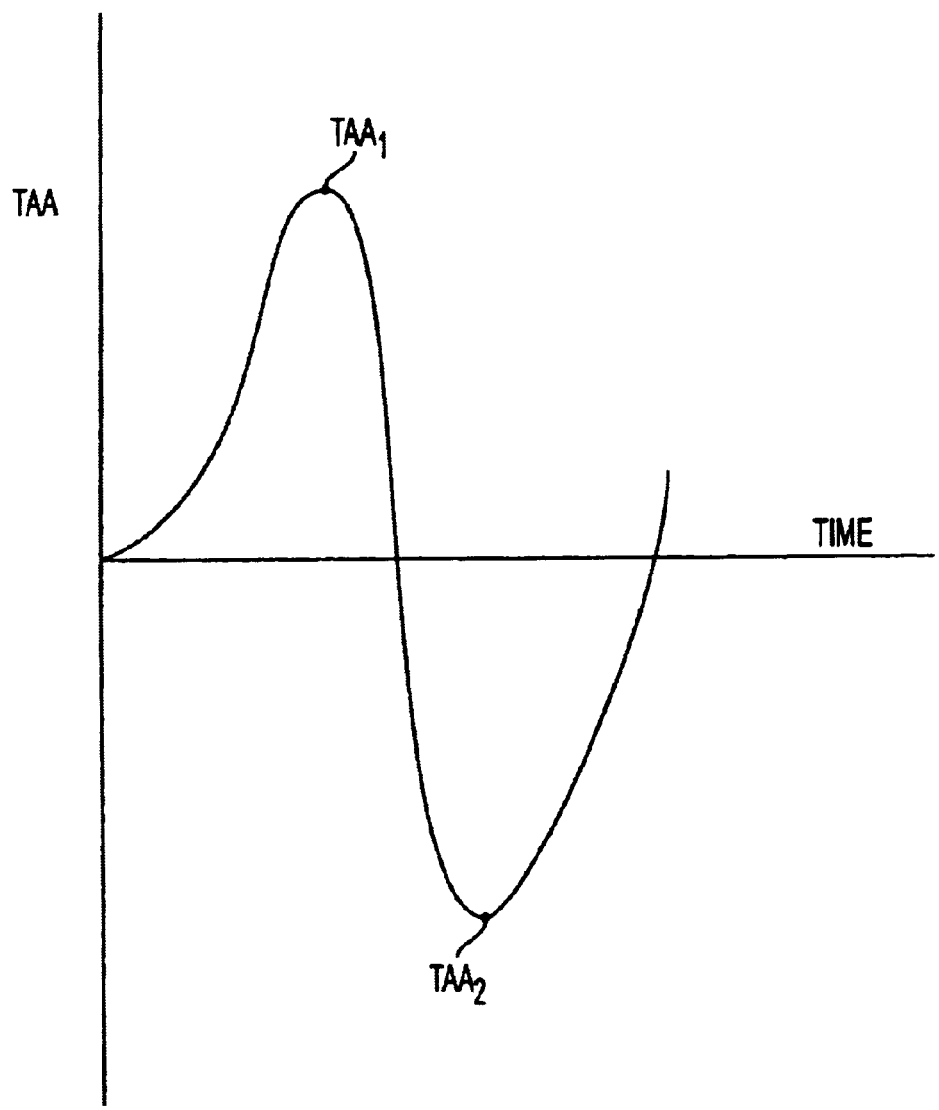
FIG. 3C is a graph illustrating track average amplitude (TAA) of a spin valve detecting a magnetic data signal over a period of time.
Figure 3D:
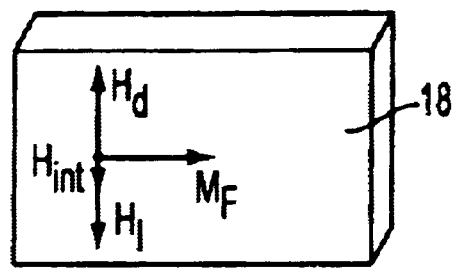
FIG. 3D illustrates the balancing of magnetic field vectors in a free layer of a spin valve.
Figure 4:
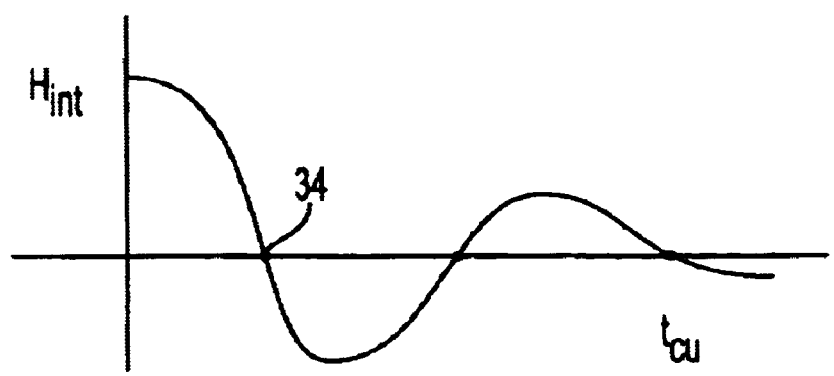
FIG. 4 is a graph illustrating the relationship between interlayer magnetizatic coupling ($H_{int}$) and copper layer thickness ($t_{cu}$)

It is certified that error appears in the above-identified patent and that said Letters Patent is hereby corrected as shown below:

<u>Column 5,</u>
Line 1, reads "FIG. 2" should read -- FIG. 2A --.

Signed and Sealed this

Thirtieth Day of November, 2004

JON W. DUDAS
*Director of the United States Patent and Trademark Office*